(12) United States Patent
Lei et al.

(10) Patent No.: US 9,762,814 B2
(45) Date of Patent: Sep. 12, 2017

(54) DATA PROCESSING METHOD AND DEVICE FOR LED TELEVISON, AND LED TELEVISION

(71) Applicant: LEYARD OPTOELECTRONIC CO., LTD., Beijing (CN)

(72) Inventors: Weilin Lei, Beijing (CN); Changjun Lu, Beijing (CN); Longhu Zhang, Beijing (CN); Zheng Sun, Beijing (CN)

(73) Assignee: LEYARD OPTOELECTRONIC CO., LTD., Beijing (CN)

( * ) Notice: Subject to any disclaimer, the term of this patent is extended or adjusted under 35 U.S.C. 154(b) by 0 days.

(21) Appl. No.: 15/111,381

(22) PCT Filed: Jul. 28, 2014

(86) PCT No.: PCT/CN2014/083167
§ 371 (c)(1),
(2) Date: Jul. 13, 2016

(87) PCT Pub. No.: WO2015/161574
PCT Pub. Date: Oct. 29, 2015

(65) Prior Publication Data
US 2017/0034450 A1    Feb. 2, 2017

(30) Foreign Application Priority Data
Apr. 23, 2015 (CN) .......................... 2014 1 0165980

(51) Int. Cl.
*H04N 5/265* (2006.01)
*H04N 5/04* (2006.01)
(Continued)

(52) U.S. Cl.
CPC .............. *H04N 5/265* (2013.01); *H04N 5/04* (2013.01); *H04N 5/9205* (2013.01); *H04N 7/01* (2013.01); *H04N 7/015* (2013.01)

(58) Field of Classification Search
CPC ........ H04N 5/265; H04N 5/04; H04N 5/9205; H04N 5/4401; H04N 5/4403; H04N 5/44; H04N 7/01; H04N 7/015
(Continued)

(56) References Cited

U.S. PATENT DOCUMENTS

| 6,067,123 | A | 5/2000 | Lee | |
|---|---|---|---|---|
| 2013/0057541 | A1* | 3/2013 | Min | H04N 13/0037 345/419 |

(Continued)

FOREIGN PATENT DOCUMENTS

| CN | 1205595 A | 1/1999 |
|---|---|---|
| CN | 101399975 A | 4/2009 |

(Continued)

OTHER PUBLICATIONS

International Search Report for PCT International Application No. PCT/CN2014/083167, mailed Sep. 2, 2014.

*Primary Examiner* — Sherrie Hsia
(74) *Attorney, Agent, or Firm* — Pearl Cohen Zedek Latzer Baratz LLP

(57) ABSTRACT

A data processing method and device for a Light emitting diode (LED) Television (TV), and an LED TV are disclosed, the data processing device includes: a signal processing chip configured to perform mode conversion on a received TV signal so as to obtain a first video signal of a preset mode; and a video processing chip connected to the signal processing chip and configured to perform clock synchronization processing on the first video signal so as to obtain a second video signal and output the second video signal to an LED display. The problem in the prior art that an LED TV can only display a TV signal of a single mode is solved, thereby achieving the effect that the LED TV can display videos of various modes and various formats.

10 Claims, 5 Drawing Sheets

(51) Int. Cl.
    *H04N 7/01*     (2006.01)
    *H04N 7/015*     (2006.01)
    *H04N 5/92*     (2006.01)

(58) Field of Classification Search
    USPC ............................. 348/500, 554, 725, 441
    IPC ..................... H04N 5/04,5/265, 5/44, 7/01
    See application file for complete search history.

(56) References Cited

U.S. PATENT DOCUMENTS

2013/0169764 A1*   7/2013   Lu ........................ G09G 3/003
                                                                                                     348/51
2014/0253816 A1*   9/2014   Shin .................... H04N 5/4403
                                                                                                   348/734

FOREIGN PATENT DOCUMENTS

| CN | 102905056 A | 1/2013 |
| CN | 103929610 | 7/2014 |

\* cited by examiner

DATA PROCESSING METHOD AND DEVICE FOR LED TELEVISON, AND LED TELEVISION

CROSS-REFERENCE TO RELATED APPLICATIONS

This application is a National Phase Application of PCT International Application No. PCT/CN2014/083167, International Filing Date Jul. 28, 2014, claiming priority of Chinese Patent Application No. 201410165980.0, filed Apr. 23, 2014, the entirety of which is hereby incorporated by reference.

FIELD OF THE INVENTION

The disclosure relates to the field of Light Emitting Diodes (LED), particularly to a data processing method and device for an LED Television (TV) and an LED TV.

BACKGROUND OF THE INVENTION

An existing self-luminous LED TV is a display device product emerged with recent development of LED display technology, and a high definition self-luminous LED display screen, which is able to implement functions including an extremely short distance, a high physical resolution and so on and has strong color performance and obviously superior grey scale and contrast, is absolutely applicable to displaying signals and images of various forms of video interfaces. However, a video interface of the existing LED TV is in a single form, and a received TV signal is displayed on the LED display screen directly, thereby resulting in poor effect of a display image as well as poor visual effect of a user.

Specifically, an LED display technology in the past, which mainly emerged in a form of a display screen, generally applies an access form of a single video interface (such as a Video Graphics Array (VGA) and a Digital Visual Interface (DVI)), and displays an accessed TV signal on the display screen directly without any processing. In other words, the existing LED TV only serves as a display screen in most cases, but does not serve as a TV and an image is displayed in poor quality.

At present, there is no effective solution yet for the problem in the prior art that an LED can only display a TV signal of a single mode.

SUMMARY OF THE INVENTION

There is no effective solution yet for the problem in the prior art that an LED can only display a TV signal of a single mode. Therefore, the major purpose of the disclosure is to provide a data processing method and device for an LED TV and an LED TV so as to solve the problem above.

A data processing device for an LED TV is provided according to an aspect of the embodiments of the disclosure so as to achieve the purpose above. The data processing device includes: a signal processing chip configured to perform mode conversion on a received TV signal so as to obtain a first video signal of a preset mode; and a video processing chip connected with the signal processing chip and configured to perform clock synchronization processing on the first video signal so as to obtain a second video signal and output the second video signal to an LED display.

Further, the signal processing chip transmits the first video signal to the video processing chip through a low voltage differential interface, wherein the low voltage differential interface is configured to divide the first video signal into a first low voltage differential video stream and a second low voltage differential video stream according to the resolution of a video, and transmit the first low voltage differential video stream and the second low voltage differential video stream to the video processing chip, wherein the first low voltage differential video stream includes two differential data streams.

Further, the video processing chip includes: a decoder, connected with the signal processing chip and configured to decode the first low voltage differential video stream so as to obtain two video signals, and decode the second low voltage differential video stream so as to obtain a third video signal; a clock processor, connected with the decoder and configured to perform clock synchronization processing on the two video signals and the third video signal so as to obtain the second video signal.

Further, the clock processor includes: a video combiner, connected with the decoder and configured to combine the two video signals into a fourth video signal; the clock processor is configured to perform clock synchronization processing on the third video signal and the fourth video signal so as to obtain the second video signal.

Further, the video combiner includes: two line caches, wherein the two line caches are connected with the decoder and video streams of two data channels of the two video signals are inputted into respective corresponding line caches respectively; a first data reader, connected with the two line caches and configured to perform a data reading operation on the two line caches according to a clock frequency of doubling so as to obtain the fourth video signal.

Further, the video processing chip further includes: a video output port, connected with the signal processing chip and configured to divide the second video signal into a preset number of sub-videos, and output the sub-videos to a display unit corresponding to the LED display so as to display the sub-videos.

Further, the data processing device further includes: a control chip, configured to send an established preset coordinate to the video output port; the video output port is configured determine to output the sub-videos to the corresponding display unit according to the preset coordinate.

Further, the video output port includes: a frame memory, configured to store the second video signal, wherein the frame memory includes a preset number of sub-ports; a second reader, connected with the frame memory and configured to read video data from the sub-ports in a polling manner according to a preset reading rule; a cache, configured cache read video data of each path and perform clock domain switching on the video data of each path so as to obtain the preset number of sub-videos; an output interface, connected with the cache and configured to output the preset number of sub-videos by means of time division multiplexing.

An LED TV is provided according to an aspect of the embodiments of the disclosure to achieve the purpose above. The LED TV includes the data processing device.

A data processing method for an LED TV is provided according to an aspect of the embodiments of the disclosure to achieve the purpose above. The data processing method includes that mode conversion is performed on a received TV signal so as to obtain a first video signal of a preset mode; clock synchronization processing is performed on the first video signal so as to obtain a second video signal; the second video signal is divided into a preset number of sub-videos; and the sub-videos are outputted to a corresponding display unit of an LED display so as to display the sub-videos.

A data processing device for an LED TV is provided according to an aspect of the embodiments of the disclosure to achieve the purpose above. The data processing device includes: a converting module, configured to perform mode conversion on a received TV signal so as to obtain a first video signal of a preset mode; a clock processing module, configured to perform clock synchronization processing on the first video signal so as to obtain a second video signal; a dividing module, configured to divide the second video signal into a preset number of sub-videos; and an output module, configured to output the sub-videos to a corresponding display unit of an LED display so as to display the sub-videos.

By means of the disclosure, a signal processing chip converts a received TV signal into a video signal of a preset mode, and a video processing chip processes and outputs the video signal to an LED display, thereby solving the problem in the prior art that an LED TV can only display a TV signal of a single mode and achieving the effect that the LED TV can display videos of various modes and various formats.

BRIEF DESCRIPTION OF THE DRAWINGS

The accompanying drawings illustrated here are used for providing further understanding to the disclosure and constitute a part of the application. The exemplary embodiments of the disclosure and illustration thereof are used for explaining the disclosure, instead of constituting improper limitation to the disclosure. In the accompanying drawings.

DETAILED DESCRIPTION OF THE INVENTION

First, some nouns and terms in the description of the embodiments of the disclosure are applicable to the following explanations:

LED: light emitting diode

Self-luminescence of an LED means that an LED device can be excited by electricity or other energy to emit lights proactively while a liquid crystal is only light-permeable, but does not emit lights itself.

The technical solutions in the embodiments of the disclosure will be described clearly and completely hereinafter with reference to the accompanying drawings in the embodiments of the disclosure so that those skilled in the art may better understand the solutions of the disclosure. Evidently, the described embodiments are merely some embodiments rather than all embodiments of the disclosure. All other embodiments obtained by persons of ordinary skill in the art based on the embodiments of the disclosure without creative efforts shall belong to the protection scope of the disclosure.

It needs to be noted that the terms "first", "second" and so on in the specification, the claims and the accompanying drawings of the disclosure are used for distinguishing similar objects, but are not necessarily used for describing a specific sequence or a precedence order. It should be understood that data used in this way are interchangeable in an appropriate condition, so that the embodiments described herein of the disclosure can be implemented in a sequence besides those illustrated or described herein. In addition, the terms "include" and "have" and any other variants of them are intended to cover non-exclusive inclusion. For example, processes, methods, systems, products, or devices that include a series of steps or units are not necessarily limited to the steps or units that are clearly listed, but may also include other steps or units that are not clearly listed or are inherent in these processes, methods, products, or devices.

Figure 1:
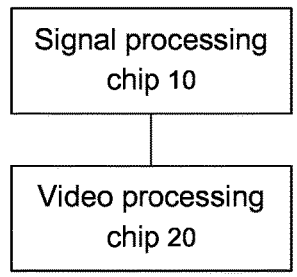
FIG. 1 is a structural diagram of a data processing device for an LED TV according to an embodiment of the disclosure.
Figure 2:
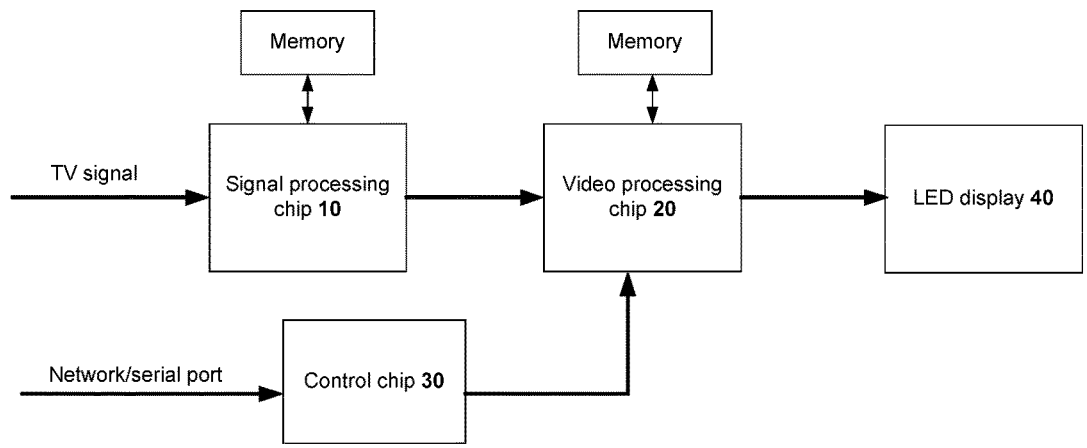
FIG. 2 is a structural diagram of an optional data processing device for an LED TV according to an embodiment of the disclosure.

FIG. 1 is a structural diagram of a data processing device for an LED TV according to an embodiment of the disclosure and FIG. 2 is a structural diagram of an optional data processing device for an LED TV according to an embodiment of the disclosure.

As shown in FIG. 1 and FIG. 2, the device may include: a signal processing chip 10 configured to perform mode conversion on a received TV signal so as to obtain a first video signal of a preset mode; and a video processing chip 20 connected with the signal processing chip 10 and configured to perform clock synchronization processing on the first video signal so as to obtain a second video signal and output the second video signal to an LED display 40, wherein the signal processing chip 10 in the embodiments above may be a TV processing chip, such as Pixelworks (a top American manufacturer of image display chips), Mstar (an embedded Integrated Circuit (IC) chip) and the video processing chip 20 applies a Field-Programmable Gate Array (FPGA). Specifically, the signal processing chip 10 and the video processing chip 20 may be provided with a memory with a storage capacity larger than 128 Mbit, respectively (such as frame memories: a Synchronous Dynamic Random Access Memory (SDRAM) and a Double Data Rate SDRAM (DDR SDRAM). The signal processing chip performs mode conversion, image enhancement and zooming processing of the TV through an accessed TV signal (including a tuner). Besides, the signal processing chip may also process other accessed signals of a High-Definition Multimedia Interface (HDMI, which is a digital interface), a Universal Serial Bus (USB), a YPrPb and so on, wherein an SDRAM is a synchronous dynamic random access memory, a DDR is a double data rate synchronous dynamic random access memory, and an IC chip is an integrated circuit.

The data processing device for an LED TV in the embodiments above may be built in an LED TV.

By means of the disclosure, a signal processing chip converts a received TV signal into a video signal of a preset mode, and a video processing chip processes and outputs the video signal to an LED display, thereby solving the problem in the prior art that an LED TV can only display a TV signal of a single mode and achieving the effect that the LED TV can display videos of various modes and various formats.

Specially, the mode conversion of the TV signal, video decoding and decryption of various interfaces, image zooming, image quality enhancement and a remote function are implemented by the TV processing chip in the embodiments above. In the embodiments above, the first video signal obtained by the TV processing chip 10 is a video stream with a fixed resolution, and such a video stream is outputted to the video processing chip in a protocol form of a Low Voltage Differential Signaling (LVDS) (an interface of an LVDS technology). The video processing chip applies a programmable logic array, and the video stream inputted by the TV processing chip is processed by a programmable logic chip.

In the embodiments above of the disclosure, the signal processing chip transmits the first video signal to the video processing chip through a low voltage differential interface, wherein the low voltage differential interface is configured to divide the first video signal into a first low voltage differential video stream and a second low voltage differential video stream according to the resolution of a video, and transmit the first low voltage differential video stream and the second low voltage differential video stream to the video processing chip, wherein the first low voltage differential video stream includes two differential data streams.

Specifically, the video stream of the first video signal processed by the TV processing chip may be divided, according to the resolution of the video, into one or two groups of LVDS videos outputted to the programmable logic chip (i.e. the video processing chip). Generally, each group of LVDSs includes one pair of differential clocks, or three or four pairs of differential data streams. More specifically, a video signal with a high resolution (i.e. the first low voltage differential video stream having a resolution of 1080P, for example) is generally outputted to the video processing chip by using two groups of LVDSs while a video signal having a low resolution (i.e. the second low voltage differential video stream having a video resolution of 1366*768 or below, for example) is outputted to the video processing chip by using one group of LVDSs.

Figure 8:
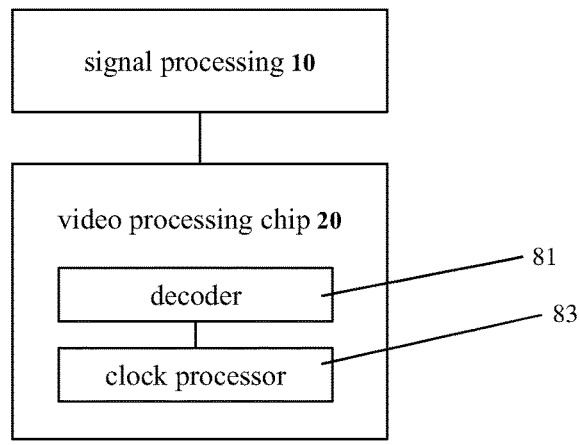
FIG. 8 is a structural diagram of a video processing ship in the data processing device for the LED TV according to an embodiment of the disclosure.

According to the embodiments above of the disclosure, as shown in FIG. 8, the video processing chip 20 may include: a decoder 81, connected with the signal processing chip 10 and configured to decode the first low voltage differential video stream so as to obtain two video signals, and decode the second low voltage differential video stream so as to obtain a third video signal; a clock processor 83, connected with the decoder 81 and configured to perform clock synchronization processing on the two video signals and the third video signal so as to obtain the second video signal.

Specifically, after receiving the first low voltage differential video stream and the second low voltage differential video stream, the video processing chip performs LVDS video stream decoding first, and it is necessary to perform clock synchronization for decoded data when the decoding is performed. In the processing process above, the video processing chip needs to combine the two video signals in the first low voltage differential video stream after decoding a high resolution video stream (i.e. the first low voltage differential video stream) transmitted by two groups of LVDSs.

Figure 9:
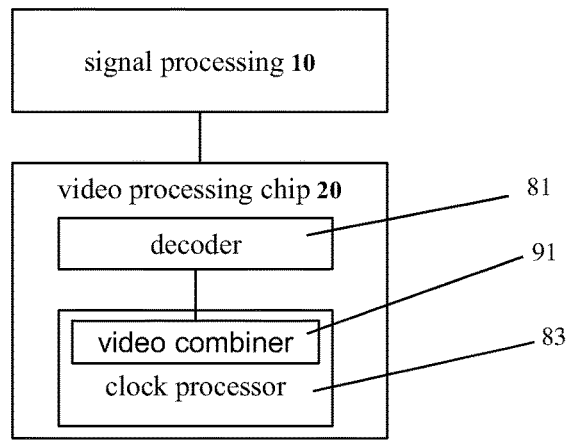
FIG. 9 is a structural diagram of a clock processor in the video processing ship in the data processing device for the LED TV according to an embodiment of the disclosure.

Specifically, as shown in FIG. 9, the clock processor 83 may include: a video combiner 91, connected with the decoder 81 and configured to combine the two video signals into a fourth video signal; the clock processor 83 is configured to perform clock synchronization processing on the third video signal and the fourth video signal so as to obtain the second video signal.

Figure 10:
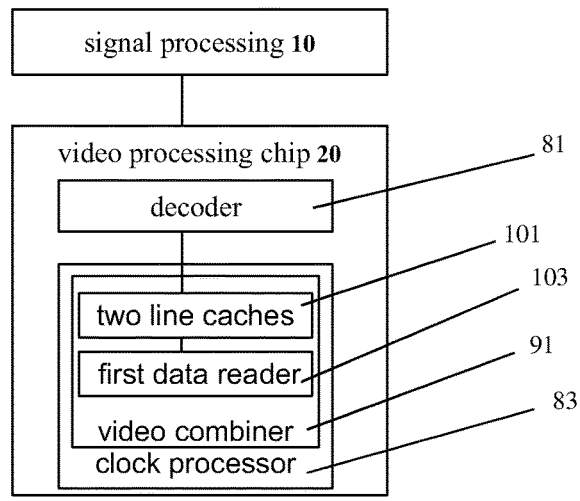
FIG. 10 is a structural diagram of a video combiner in the clock processor in the video processing ship in the data processing device for the LED TV according to an embodiment of the disclosure.

According to the embodiments above of the disclosure, as shown in FIG. 10, the video combiner 91 may include: two line caches 101, wherein the two line caches 101 are connected with the decoder 81 and video streams of two data channels of the two video signals are inputted into respective corresponding line caches 101 respectively; a first data reader 103, connected with the two line caches 101 and configured to perform a data reading operation on the two line caches 101 according to a clock frequency of doubling so as to obtain the fourth video signal.

Figure 3:
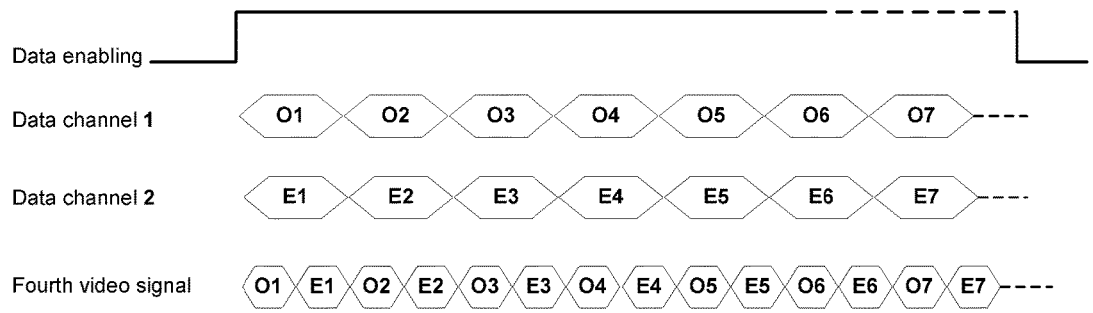
FIG. 3 is a sequence chart of obtaining a fourth video signal according to an embodiment of the disclosure.

As shown in FIG. 3, a processing method for combining the two video signals (one of which is data O1, O2, O3, O4, O5, O6, O7, . . . , of data channel 1 and the other one is data E1, E2, E3, E4, E5, E6, E7, . . . of data channel 2) is to interleave data of two paths into data of one path, that is, to output one piece of data of data channel 1 by means of data enabling, and then output one piece of data of data channel 2, thereby outputting data of the two channels alternatively and cyclically in turn. Since a downlink period of validity is unchanged, a pixel data clock frequency is doubled after the combination. In the embodiments above of the disclosure, the two line caches are applied, the video streams of the two data channels are inputted to into respective caches respectively, and a clock with a clock frequency of doubling is applied to performing a data reading operation on the two line caches, that is, one piece of data is read from line cache 1 and another piece of data is read from the other line cache subsequently, and the data are read alternatively in turn so as to obtain the fourth video signal, as shown by O1, E1, O2, E2, O3, E3, O4, E4, O5, E5, O6, E6, O7, E7, . . . in FIG. 3. It is unnecessary to combine video data of a low resolution video stream (i.e. the second low voltage differential video stream) since there is only one group of LVDSs.

Figure 11:
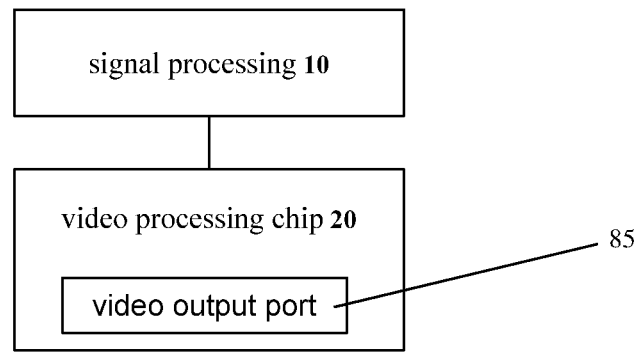
FIG. 11 is another structural diagram of a video processing ship in the data processing device for the LED TV according to an embodiment of the disclosure.

In the embodiments above of the disclosure, as shown in FIG. 11, the video processing chip 20 may further include: a video output port 85, connected with the signal processing chip 10 and configured to divide the second video signal into a preset number of sub-videos, and output the sub-videos to a display unit corresponding to the LED display so as to display the sub-videos.

Since an LED high-definition TV panel applies an integrated display screen formed by splicing display units. Data streams transmitted by the video processing chip to the LED display are a plurality of parallel data streams. Specifically, it is set that n data streams are outputted to an LED screen, and an image of a whole frame of a video image is divided into n sub-images (the n images may be spliced into a frame of a completed image). A matched sub-image corresponding to each video is outputted and displayed on a corresponding display unit. In this way, the transmission rate is largely reduced in a fixed period of time, wherein n is a preset quantity and a natural number.

By means of the embodiments above, a data volume which is 1/n of an original image is transmitted at a rate which is 1/n of an original one within a period, thereby improving the reliability of video transmission.

According to the embodiments above of the disclosure, the data processing device may further include: a control chip 30 as shown in FIG. 2, configured to send an established preset coordinate to the video output port; as shown in FIG. 11, the video output port 85 is configured determine to output the sub-videos to the corresponding display unit according to the preset coordinate, wherein the control chip may be implemented by using a Microcontroller Unit (MCU). An LED high-definition TV processing system is implemented by a design combining the TV processing chip, the video processing chip and the control chip in the embodiments above, which can not only improve the reliability of video transmission, but also improve the flexibility of video control.

A range of a specific image transmission area of each path may be configured and set flexibly so as to improve the flexibility of image transmission of each path. Specifically, a range of image transmission is determined through the preset coordinate determined by the control chip, so as to output a sub-video to a corresponding display unit. For example, an image area of transmission of each path is determined by the location (X,Y) of the upper left corner of the image area in the whole frame of an image.

Figure 4:
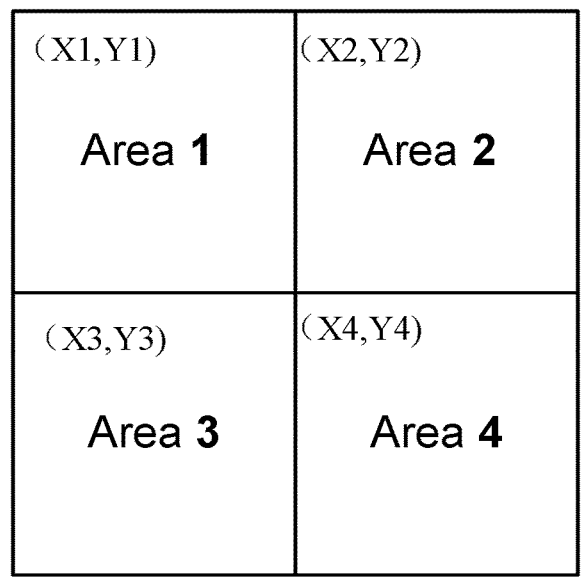
FIG. 4 is a schematic diagram of determining an area of a display unit according to an embodiment of the disclosure.

FIG. 4 shows that four sub-videos are outputted to the LED display, and display units corresponding to the four sub-videos are read 1, area 2, area 3 and area 4 respectively, wherein an area of each display unit in a whole frame of an image is determined by using the location (x,y) of the upper left corner. The display locations (or display units) of area 1 to area 4 may be determined by four coordinates (x1,y1), (x2,y2), (x3,y3) and (x4,y4) as shown in FIG. 4. Optionally, the locations of respective areas may be adjusted by setting the coordinate of X, Y (the preset coordinate). In the embodiments above, the preset coordinate is obtained by a microprocessor (i.e. the control chip). As shown in FIG. 2, command configuration may be performed on the control chip by means of a network or a serial port so as to obtain the preset coordinate. Before outputting the sub-videos, each sub-video may be subjected to LVDS coding again and outputted to the LED screen body subsequently so as to display the sub-videos.

Figure 12:
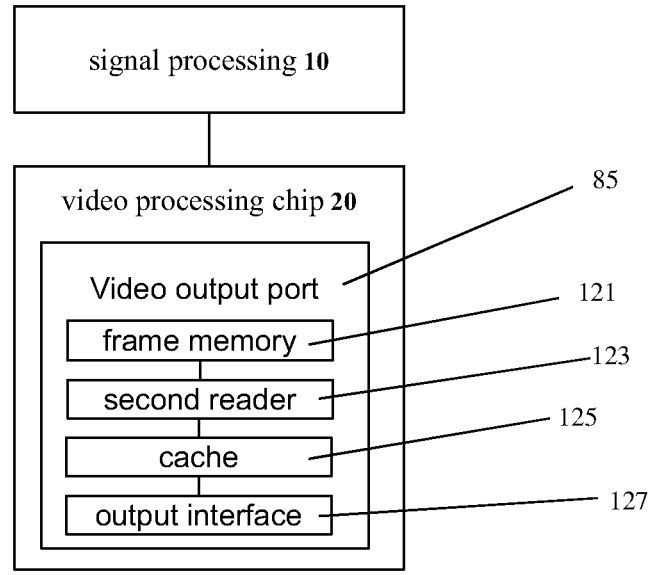
FIG. 12 is another structural diagram of a video output port in the video processing ship in the data processing device for the LED TV according to an embodiment of the disclosure.

It needs to be further noted that, as shown in FIG. 12, the video output port 85 may include: a frame memory 121, configured to store the second video signal, wherein the frame memory 121 includes a preset number of sub-ports; a second reader 123, connected with the frame memory 121 and configured to read video data from the sub-ports in a polling manner according to a preset reading rule; a cache 125, configured cache read video data of each path and perform clock domain switching on the video data of each path so as to obtain the preset number of sub-videos; an output interface 127, connected with the cache 125 and configured to output the preset number of sub-videos by means of time division multiplexing.

Figure 5:
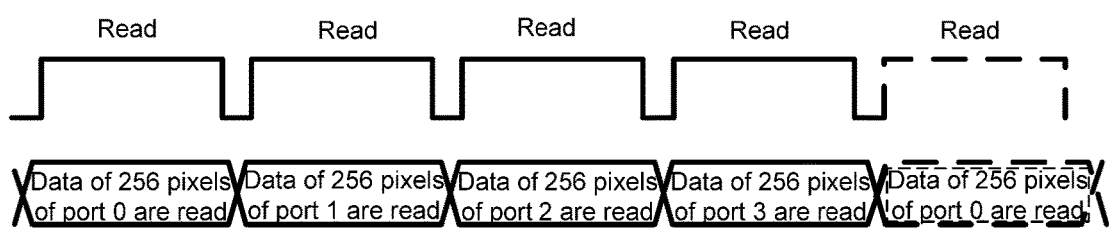
FIG. 5 is a sequence chart of a method for reading data of a sub-video according to an embodiment of the disclosure.

Specifically, video data may be stored by the frame memory first, and then read according to the preset reading rule to as to implement configuration of any sub-video. As shown in FIG. 5, when reading is performed, a period is formed by starting a process for four times (256 pieces of data are read each time), that is, data of 256 pixels (256 pieces of data are read each time a reading process is started) are read in a first reading of each period is data of port 0, data of 256 pixels of port 1 are read when reading is started for a second time, data of 256 pixels of port 2 are read in a third reading, and data of 256 pixels of port 3 are read in a fourth reading. In this way, the four ports are read in a polling manner, and video data of each path are cached by a cache, so as to perform clock domain switching. A writing clock frequency of the cache is about 4 times of a reading frequency, thus read data steams are continuous. By means of the disclosure, such a multipath output method will ensure strict synchronic output of the four videos, thereby avoiding the problem that a feeling of an unsynchronized torn image is caused by displaying an image moving violently on a whole screen due to a high LED refresh frequency.

The disclosure further provides an LED display device which may include any data processing device in the embodiments above.

By means of the disclosure, a signal processing chip converts a received TV signal into a video signal of a preset mode, and a video processing chip processes and outputs the video signal to an LED display, thereby solving the problem in the prior art that an LED TV can only display a TV signal of a single mode and achieving the effect that the LED TV can display videos of various modes and various formats.

By means of the disclosure, an overall plan of an LED TV front end is implemented, display processing of images is carried out and high system reliability may be ensured for input and display of a standard definition image and a high definition image.

Figure 6:
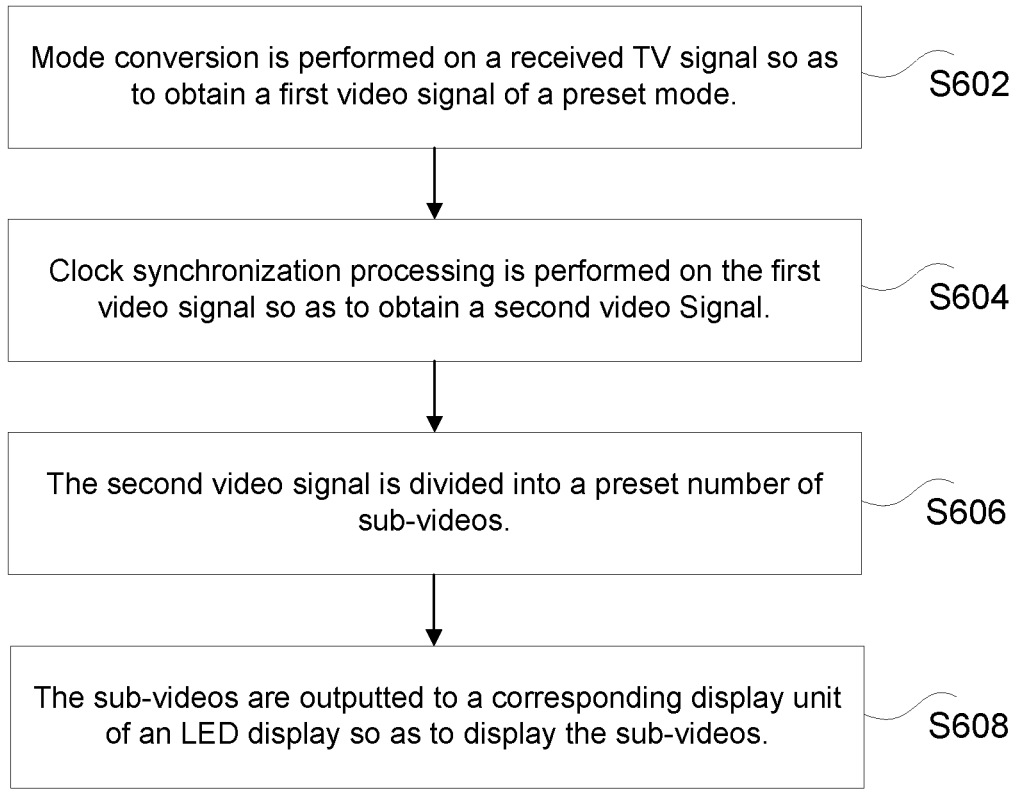
FIG. 6 is a flowchart of a data processing method for an LED TV according to an embodiment of the disclosure.

FIG. 6 is a flowchart of a data processing method for an LED TV according to an embodiment of the disclosure. As shown in FIG. 6, the method may be implemented by the following steps.

Step 602: Mode conversion is performed on a received TV signal so as to obtain a first video signal of a preset mode.

Step 604: Clock synchronization processing is performed on the first video signal so as to obtain a second video Signal.

Step 606: The second video signal is divided into a preset number of sub-videos.

Step 608: The sub-videos are outputted to a corresponding display unit of an LED display so as to display the sub-videos.

By means of the disclosure, a signal processing chip converts a received TV signal into a video signal of a preset mode, and a video processing chip processes and outputs the video signal to an LED display, thereby solving the problem in the prior art that an LED TV can only display a TV signal of a single mode and achieving the effect that the LED TV can display videos of various modes and various formats. In addition, sub-videos are outputted to a display unit corresponding to the LED display and displayed after a second video signal is divided into a preset number of sub-videos, thereby not only improving the reliability of video transmission, but also improving the flexibility of video control.

The data processing method in the embodiment above of the disclosure may be implemented by using a video data processing method of each chip in the foregoing method embodiments.

It needs to be noted that the steps illustrated in the flowcharts of the accompanying drawings may be executed in a computer system, such as a group of computer executable instructions, and although logical sequences have been illustrated in the flowcharts, the steps as illustrated or described may be executed by a sequence different from the sequences described herein.

Figure 7:
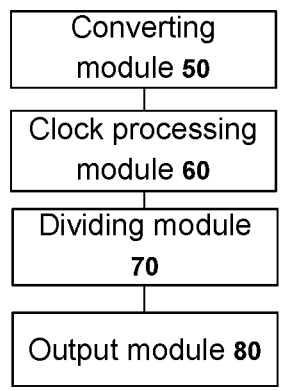
FIG. 7 is a schematic diagram of a data processing device for an LED TV according to an embodiment of the disclosure.

FIG. 7 is a schematic diagram of a data processing device for an LED TV according to an embodiment of the disclosure. As shown in FIG. 7, the data processing device may include: a converting module 50, configured to perform mode conversion on a received TV signal so as to obtain a first video signal of a preset mode; a clock processing module 60, configured to perform clock synchronization processing on the first video signal so as to obtain a second video signal; a dividing module 70, configured to divide the second video signal into a preset number of sub-videos; and an output module 80, configured to output the sub-videos to a corresponding display unit of an LED display so as to display the sub-videos.

By means of the disclosure, a signal processing chip converts a received TV signal into a video signal of a preset mode, and a video processing chip processes and outputs the video signal to an LED display, thereby solving the problem in the prior art that an LED TV can only display a TV signal of a single mode and achieving the effect that the LED TV can display videos of various modes and various formats. In addition, sub-videos are outputted to a display unit corresponding to the LED display and displayed after a second video signal is divided into a preset number of sub-videos, thereby not only improving the reliability of video transmission, but also improving the flexibility of video control.

The data processing device in the embodiment above of the disclosure may be implemented by using a video data processing method of each chip in the foregoing method embodiments.

The disclosure may implement functions including access of a TV signal, signal enhancement, remote control and so on of a self-luminous LED TV, and process TV signals and various video signals so that the TV signals and the video signals are applicable to a display function of an LED high definition TV system.

It may be seen from the foregoing description that the disclosure has implemented the following technical effect.

By means of the disclosure, access, processing and display of TV signals and various video signals of a high definition LED TV may be implemented. In the meanwhile, video streams are combined and processed synchronously at a video processing chip, a plurality of videos consistent with an LED display method are configured and outputted flexibly, and a time division multiplexing processing method of strict synchronic output of the plurality of videos is applied, thereby improving the display quality of an image and the reliability of signal transmission.

Obviously, those skilled in the art should understand that the modules or steps of the disclosure may be implemented by general-purpose computing devices and centralized in a single computing device or distributed over a network consisting of a plurality of computing devices. Optionally, they may be implemented by program codes executable by a computing device, so that they may be stored in a storage device and executed by the computing device, or they may be implemented by respectively fabricating them into respective integrated circuit modules or by fabricating a plurality of modules or steps of them into a single integrated circuit module. By doing so, the disclosure is not limited to any specific combination of hardware and software.

The above are only preferred embodiments of the disclosure and should not be used for limiting the disclosure. For those skilled in the art, the disclosure may have various modifications and changes. Any modifications, equivalent replacements, improvements and the like within the spirit and principles of the disclosure shall fall within the scope of protection of the disclosure.

What is claimed is:

1. A data processing device for a Light emitting diode (LED) Television (TV), comprising:
a signal processing chip configured to perform mode conversion on a received TV signal so as to obtain a first video signal of a preset mode; and
a video processing chip connected with the signal processing chip and configured to perform clock synchronization processing on the first video signal so as to obtain a second video signal and output the second video signal to an LED display, wherein:
the signal processing chip is configured to transmit the first video signal to the video processing chip through a low voltage differential interface, and
the low voltage differential interface is configured to divide the first video signal into a first low voltage differential video stream and a second low voltage differential video stream according to the resolution of a video, and transmit the first low voltage differential video stream and the second low voltage differential video stream to the video processing chip, wherein the first low voltage differential video stream comprises two differential data streams.

2. The data processing device according to claim 1, wherein the video processing chip comprises:
a decoder, connected with the signal processing chip and configured to decode the first low voltage differential video stream so as to obtain two video signals, and decode the second low voltage differential video stream so as to obtain a third video signal;
a clock processor, connected with the decoder and configured to perform clock synchronization processing on the two video signals and the third video signal so as to obtain the second video signal.

3. The data processing device according to claim 2, wherein the clock processor comprises:
a video combiner, connected with the decoder and configured to combine the two video signals into a fourth video signal;
the clock processor is configured to perform clock synchronization processing on the third video signal and the fourth video signal so as to obtain the second video signal.

4. The data processing device according to claim 3, wherein the video combiner comprises:
two line caches, wherein the two line caches are connected with the decoder and video streams of two data channels of the two video signals are inputted into respective corresponding line caches respectively;
a first data reader, connected with the two line caches and configured to perform a data reading operation on the two line caches according to a clock frequency of doubling so as to obtain the fourth video signal.

5. The data processing device according to claim 1, wherein the video processing chip further comprises:
a video output port, connected with the signal processing chip and configured to divide the second video signal into a preset number of sub-videos, and output the sub-videos to a display unit corresponding to the LED display so as to display the sub-videos.

6. The data processing device according to claim 5, wherein the data processing device further comprises:
a control chip, configured to send an established preset coordinate to the video output port;
the video output port is configured determine to output the sub-videos to the corresponding display unit according to the preset coordinate.

7. The data processing device according to claim 5, wherein the video output port comprises:

a frame memory, configured to store the second video signal, wherein the frame memory comprises a preset number of sub-ports;

a second reader, connected with the frame memory and configured to read video data from the sub-ports in a polling manner according to a preset reading rule;

a cache, configured cache read video data of each path and perform clock domain switching on the video data of each path so as to obtain the preset number of sub-videos;

an output interface, connected with the cache and configured to output the preset number of sub-videos by means of time division multiplexing.

8. An LED TV, comprising the data processing device according to claim 1.

9. A data processing method for an LED TV, comprising:

performing mode conversion on a received TV signal so as to obtain a first video signal of a preset mode;

performing clock synchronization processing on the first video signal so as to obtain a second video signal;

dividing the second video signal into a preset number of sub-videos; and outputting the sub-videos to a corresponding display unit of an LED display so as to display the sub-videos;

wherein the first video signal is transmitted through a low voltage differential interface, wherein the low voltage differential interface is configured to divide the first video signal into a first low voltage differential video stream and a second low voltage differential video stream according to the resolution of a video, and transmit the first low voltage differential video stream and the second low voltage differential video stream, wherein the first low voltage differential video stream comprises two differential data streams.

10. A data processing device for an LED TV, comprising:

a converting module, configured to perform mode conversion on a received TV signal so as to obtain a first video signal of a preset mode;

a clock processing module, configured to perform clock synchronization processing on the first video signal so as to obtain a second video signal;

a dividing module, configured to divide the second video signal into a preset number of sub-videos;

and an output module, configured to output the sub-videos to a corresponding display unit of an LED display so as to display the sub-videos wherein the data processing device further comprises: a low voltage differential interface, wherein the low voltage differential interface is configured to transmit the first video signal is transmitted, wherein the low voltage differential interface is further configured to divide the first video signal into a first low voltage differential video stream and a second low voltage differential video stream according to the resolution of a video, and transmit the first low voltage differential video stream and the second low voltage differential video stream, wherein the first low voltage differential video stream comprises two differential data streams.

* * * * *